2,455,053

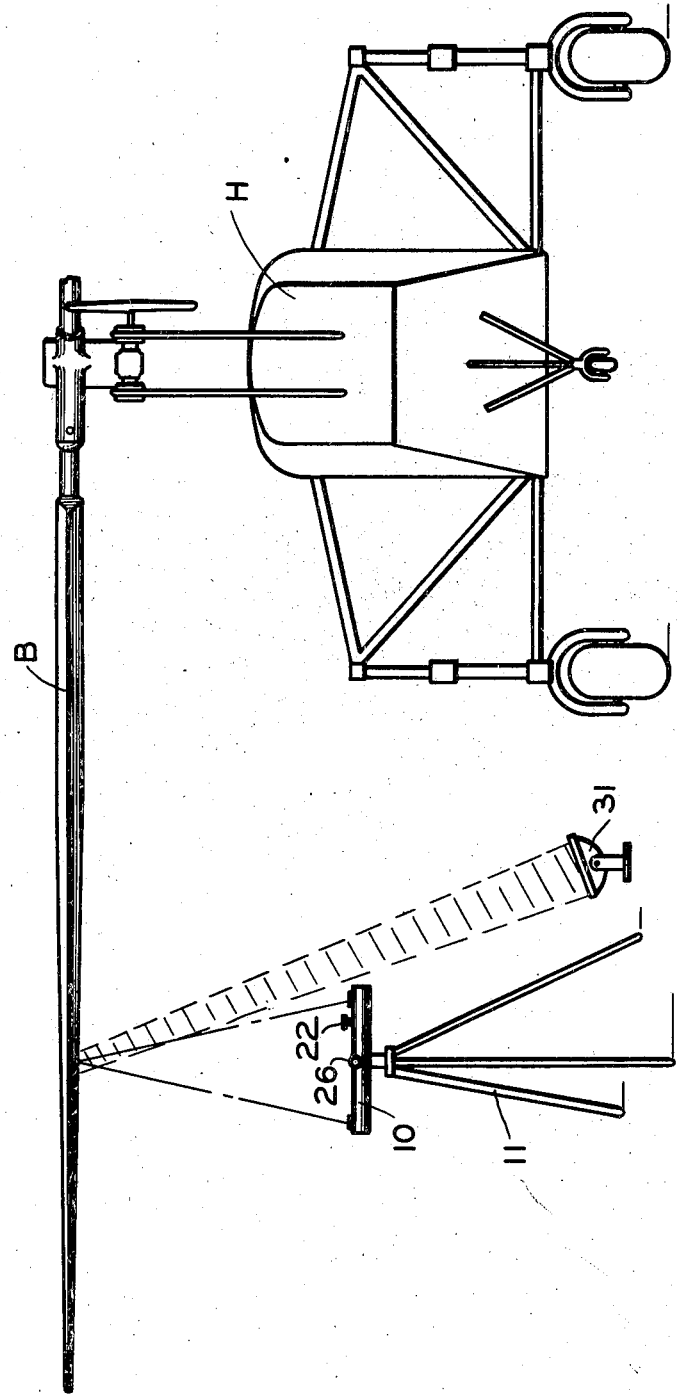
Nov. 30, 1948.   E. F. FLINT   2,455,053
OPTICAL METHOD AND APPARATUS FOR
CHECKING PROPELLER BLADES
Filed March 9, 1945   2 Sheets-Sheet 1
EDWARD F. FLINT
INVENTOR
ATTORNEY Nov. 30, 1948.
E. F. FLINT
2,455,053
OPTICAL METHOD AND APPARATUS FOR
CHECKING PROPELLER BLADES
Filed March 9, 1945
2 Sheets—Sheet 2
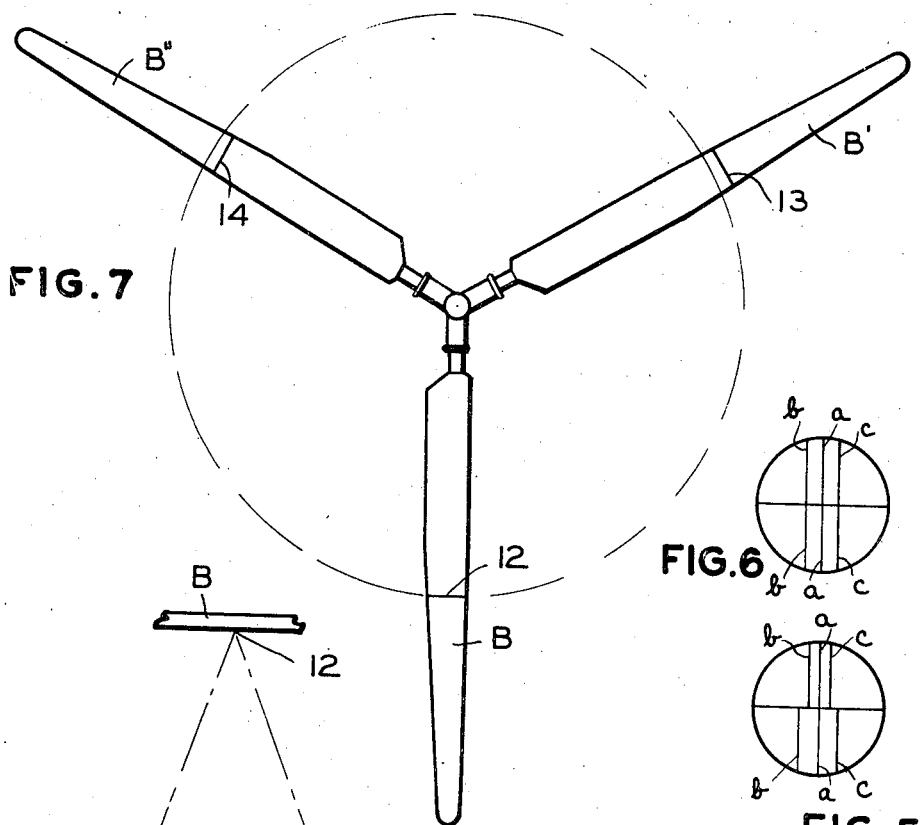
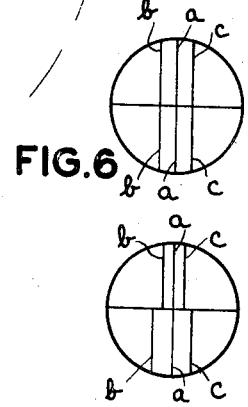
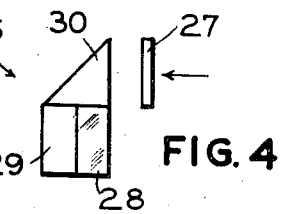
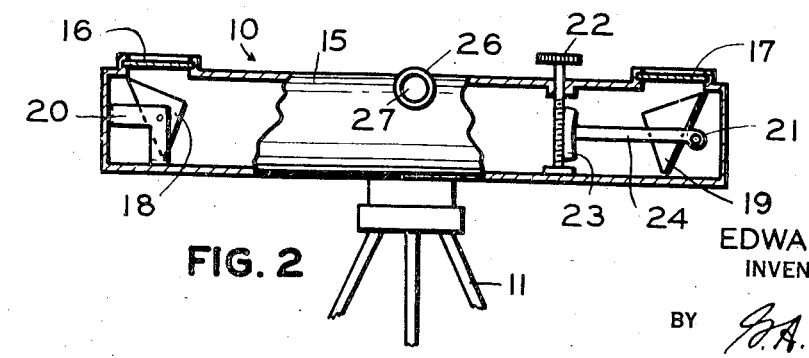
EDWARD F. FLINT
INVENTOR
BY *J. A. Ellestad*
ATTORNEY Patented Nov. 30, 1948

UNITED STATES PATENT OFFICE 2,455,053

OPTICAL METHOD AND APPARATUS FOR CHECKING PROPELLER BLADES

Edward F. Flint, Brighton, N. Y., assignor to Bausch & Lomb Optical Company, Rochester, N. Y., a corporation of New York Application March 9, 1945, Serial No. 581,847

8 Claims. (Cl. 88—14)

This invention relates to a method and apparatus for checking the relative positions of the blades of a propeller while it is being rotated.

With propellers such as used on helicopters, for example, it is necessary that the blades be properly adjusted so as to avoid vibration. The pitch of the blades of a helicopter propeller can be checked by noting whether each blade, as it passes a given point, is at the same distance from a reference plane. Since the blades are subject to various forces and stresses while the propeller is being rotated, it is necessary that the tests be made while the propeller is in operation. When the relative positions of the blades have been checked, the blades are adjusted individually so that corresponding portions of each blade are at the same distance from the reference plane, as the blades pass through a given point.

One of the objects of my invention is to provide an improved method for indicating the relative positions of the blades of a propeller while in operation. Another object is to provide an improved apparatus for indicating the relative positions of the blades of a propeller during rotation. Further objects are to provide an optical method and apparatus for determining or checking the positions of the blades of a rotating propeller relative to a reference plane. These and other objects and advantages will be apparent from the following specification.

Referring to the drawings:

Fig. 1 is a view showing my apparatus in use for checking the blades of a helicopter.

Fig. 2 is a side view of my apparatus with parts broken away.

Fig. 3 is a diagrammatic view showing the side elevation of the optical system of my apparatus.

Fig. 4 is an end view of the prism assembly used in the optical system.

Fig. 5 shows the appearance of the field of view of the apparatus when all of the blades are not in proper adjustment.

Fig. 6 shows the field of view when all blades are in proper position.

Fig. 7 is a view showing the locations of the index marks on the undersides of the propeller blades.

A method and apparatus of carrying out my invention are illustrated in the drawings wherein 10 indicates the optical apparatus which is carried by a tripod 11 and positioned under the blades of the rotating propeller of the helicopter H. As shown more clearly in Fig. 7, an index mark 12 is placed on the underside of blade B with the mark extending transversely of the blade. Another index mark 13 is placed on the underside of blade B' and it is located at a greater distance from the center of rotation of the propeller than the mark 12. Another index mark 14 is placed on the underside of blade B" and it is located at a distance from the center of rotation which is less than that from the center of rotation to the mark 12.

The apparatus 10, shown more fully in Figs. 2, 3, and 4, embodies a casing 15 having the plano windows 16 and 17 located on the top side of the casing at the respective ends thereof. Reflecting devices such as prisms 18 and 19 are positioned, respectively, opposite the windows 16 and 17. The prism 18 is fixedly held in a suitable mount 20 and the prism 19 is held in a pivoted mount 21 which is adapted to be adjusted by turning the screw 22 which engages a gear sector 23 carried by the lever 24. Located between the prisms 18 and 19 is the prism system 25 which receives reflected light rays therefrom and directs them rearwardly through a viewing tube 26 in which is mounted a plano window 27. As shown in Figs. 3 and 4, the prism system 25 comprises two right angle prisms 28 and 29 which are positioned in end to end relation and with their hypotenuse surfaces respectively facing the prisms 18 and 19. A large right angle prism 30 is positioned above the prisms 28 and 29 so as to receive rays from each prism and thereby provide upper and lower contiguous field portions when viewed through the tube 26. It will be apparent that by adjusting the angular position of prism 19 by screw 22, the images a, in the upper and lower portions of the field of view, of the mark 12 may be brought into aligned coincidence as shown in Fig. 5.

If the blades B' and B" are not in proper adjustment, the images b and c of the index marks, carried by these blades, will not be in coincidence. The blades B' and B" may then be individually adjusted so that all of the images of the index marks are brought into coincidence as shown in Fig. 6. When all of the images are in aligned coincidence, as in Fig. 6, the corresponding portion of each blade is at the same distance from a reference plane so that the blades have the same pitch when passing a given point. It will be understood, of course, that this test is being made while the propeller is in motion so that images of all index marks are simultaneously visible in the viewing tube 26 because of the persistence of vision. Suitable illuminating means such as a spot light 31 may be employed to provide proper illumination on the undersides of the blades so that the index marks will be clearly visible. Instead of adjusting one of the end prisms to bring two images of one index mark into aligned coincidence, the entire apparatus 10 could be raised or lowered vertically by any suitable means until the images of one index line are brought into coincidence. It will be obvious that various modifications may be made in the optical apparatus 10 such as, for example, adding telescope lenses to the system.

From the foregoing it will be apparent that I am able to obtain the objects of my invention and provide an improved method and apparatus for checking the relative positions of the blades of a propeller during rotation. Various modifications can, of course, be made without departing from the spirit of my invention as pointed out in the appended claims.

I claim:

1. The method of indicating the positions of the blades of a propeller relative to a fixed plane while the propeller is being rotated which comprises the steps of providing aligning indicia means on each blade with the indicia means placed at a different distance from the propeller axis for each blade, rotating the propeller and simultaneously forming at least two adjacent images of each indicia means in an image field in said plane in such a manner that the relative positions of the adjacent images of the several indicia means are, respectively, functions of the distances from the indicia means to the image field and hence indicate the relative positions of the respective blades relative to the plane.

2. The method of indicating the relative positions of the blades of a propeller while it is being rotated which comprises the steps of placing an index line on each blade transversely of the axis of the blade, with the distance from the line to the propeller axis different for each blade, rotating the propeller, and simultaneously forming two adjacent images of each index line in the respective upper and lower portions of an image field in such a manner that the relative positions of the adjacent images of the several lines are, respectively, functions of the distances between the lines and the image field whereby the relative positions of the blades with respect to the image field are indicated.

3. The method of determining the relative positions of a plurality of blades of a propeller while being rotated at operating speed which comprises the steps of placing on each blade an aligning index mark which is located at a different distance from the propeller axis for each blade, rotating the propeller at the operating speed, forming respectively in different contiguous portions of an image field a plurality of images of each mark in such a manner that the relative positions of the adjacent images of the several marks are functions of the distances between the respective marks and the image field, and determining the relative positions of the blades by noting the relative positions of the images of the marks.

4. The method of checking the pitch of the blades of a helicopter rotor while being rotated which comprises placing an aligning index mark on each blade of the rotor with the mark on each blade at a different distance from the rotational axis of the rotor, turning the rotor at operating speed, simultaneously forming images of each mark in contiguous portions of an image field so that the relative positions of the images of each mark in the respective portions of the field are a function of the distance of the mark from the image field, and checking the pitch of one blade relative to that of the others by noting the relative positions of the images of each mark in the respective portions of the image field.

5. A device for determining the relative positions of the blades of a propeller during rotation which comprises aligning indicia means carried by each blade, the distance from the aligning indicia means to the rotation axis of the propeller being different for each blade, optical means for forming during rotation of the propeller an image of each indicia means in each of a plurality of superposed contiguous portions of an image field, and means for aligning the images of the indicia means on at least one blade whereby the relative positions of the images of each of the other indicia means will indicate the relative positions of the remaining blades relative to said one blade.

6. A device for determining the relative positions of the blades of a propeller during rotation which comprises aligning indicia means carried by each blade, the distance from the indicia means to the rotation axis of the propeller being different for each blade, optical means for forming images of the indicia means during rotation of the propeller, said optical means comprising spaced reflectors, a pair of superposed reflecting devices positioned between the reflectors, said reflectors being positioned to receive light rays from the indicia means and direct them laterally to the respective reflecting devices whereby an image of each indicia means is formed in contiguous portions of the field of view, and means for adjusting at least one reflector to bring the images of the indicia means on each blade into alignment in the two portions of the field.

7. A method of indicating the positions of the blades of a propeller relative to a fixed plane while the propeller is rotating which comprises the steps of providing an index line transversely of the axis of and on each blade, with the lines on each blade placed at respectively different distances from the axis of the propeller, rotating the propeller and simultaneously forming at least two images of each line in an image field so that the relative positions of the images of each line are a function of the distance from the line to the image field, establishing the reference plane in the image field by bringing into alignment the images of the line on one blade whereby the relative positions of the images of the lines on the other blades will indicate the relative positions of the blades relative to the reference plane.

8. A device for checking the relative positions of the blades of a propeller during rotation which comprises an index line carried by each blade and extending transversely of the axis of the blade, the distance from the index line to the rotation axis of the propeller being different for each blade, optical means for forming in an image field during rotation of the propeller an image of each index line in each of a plurality of contiguous portions of an image field so that the relative positions of the contiguous images of the several lines are, respectively, functions of the distances from the lines to the image field, and means for aligning the images of the line on at least one blade whereby the relative positions of the images of each of the other lines will indicate the relative positions of the other blades relative to said one blade.

EDWARD F. FLINT.

REFERENCES CITED

The following references are of record in the file of this patent:

UNITED STATES PATENTS

| Number | Name | Date |
| --- | --- | --- |
| 1,283,943 | Sperry | Nov. 5, 1918 |